May 15, 1934.  J. H. SHERTS  1,959,221

METHOD AND APPARATUS FOR MAKING SAFETY GLASS

Filed June 15, 1932  3 Sheets-Sheet 1

INVENTOR
J. H. Sherts
by
Bradley & Bee
attys

May 15, 1934.   J. H. SHERTS   1,959,221
METHOD AND APPARATUS FOR MAKING SAFETY GLASS
Filed June 15, 1932   3 Sheets-Sheet 2
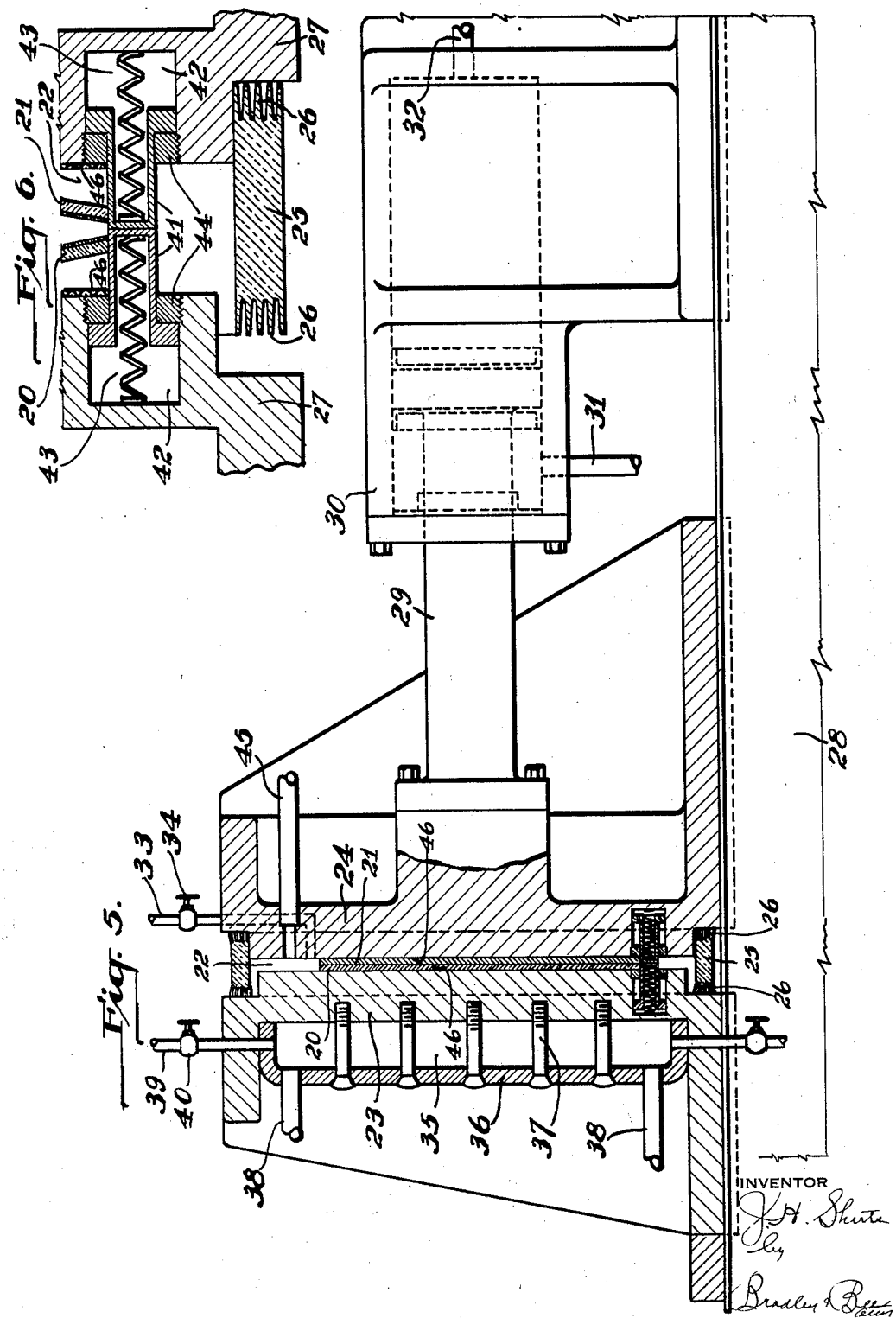
INVENTOR
J. H. Sherts

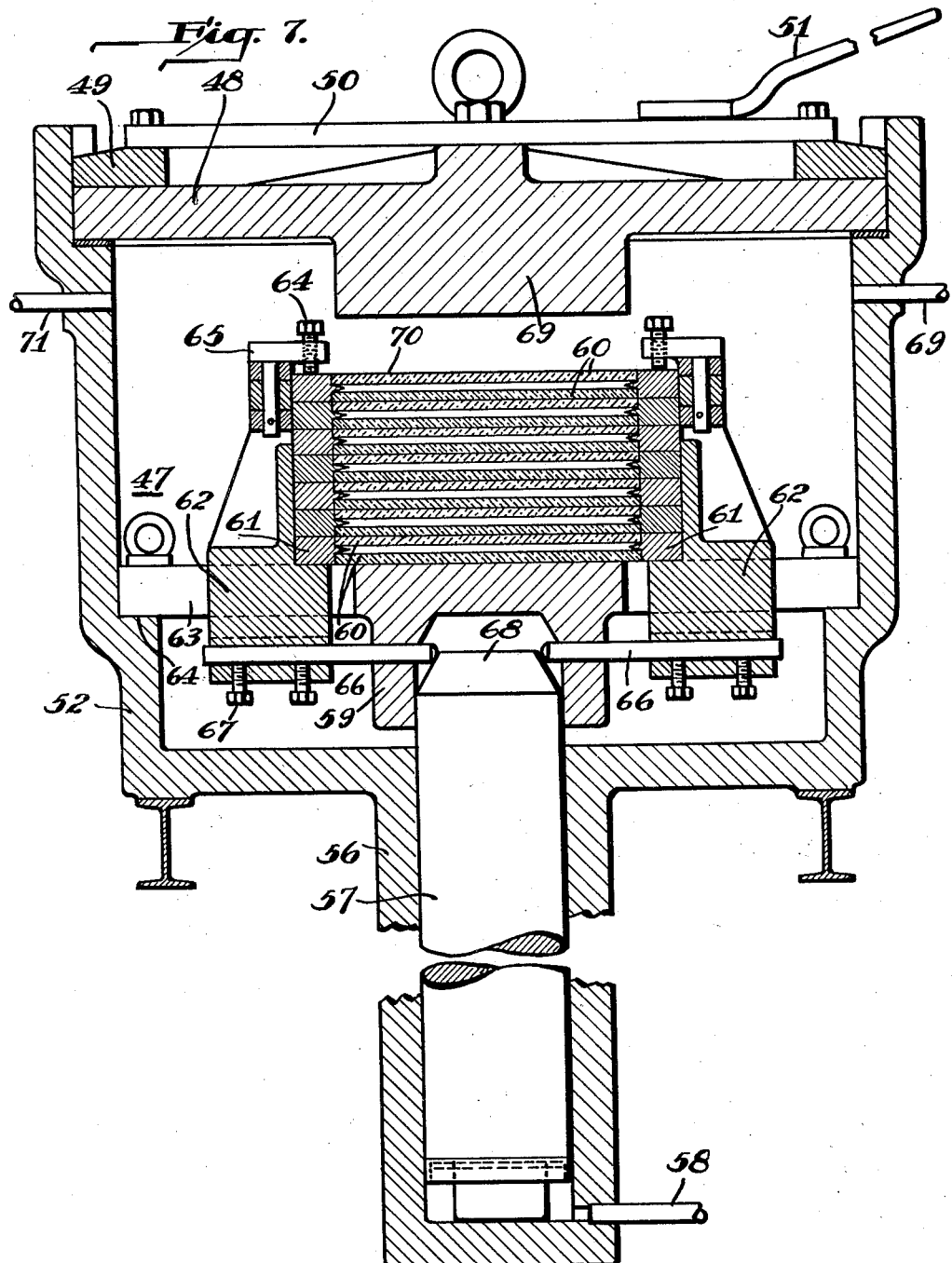

Patented May 15, 1934

1,959,221

UNITED STATES PATENT OFFICE 1,959,221

METHOD AND APPARATUS FOR MAKING SAFETY GLASS

James H. Sherts, Brackenridge, Pa., assignor to Duplate Corporation, a corporation of Delaware Application June 15, 1932, Serial No. 617,281

16 Claims. (Cl. 49—81)

Figure 1:
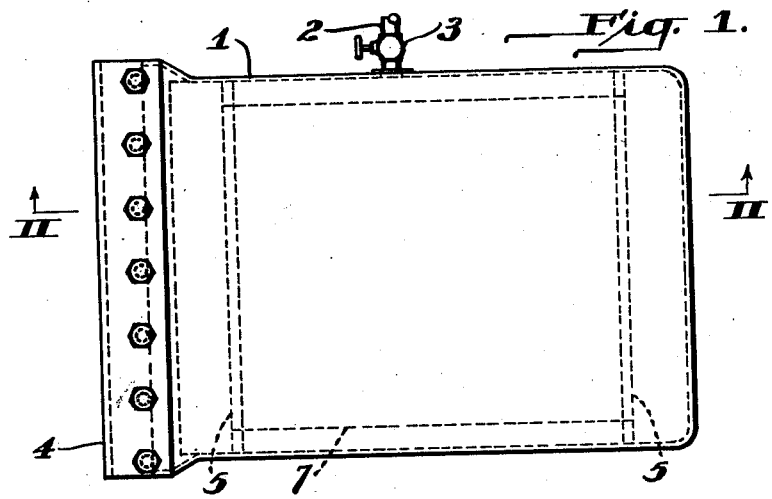
Figure 2:
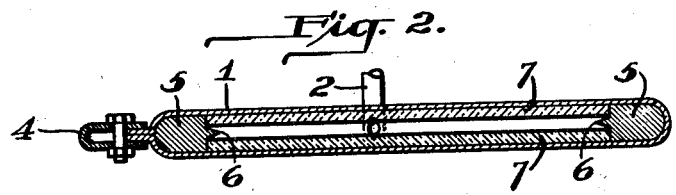
Figure 3:
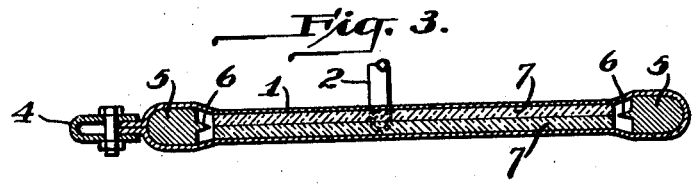
Figure 4:
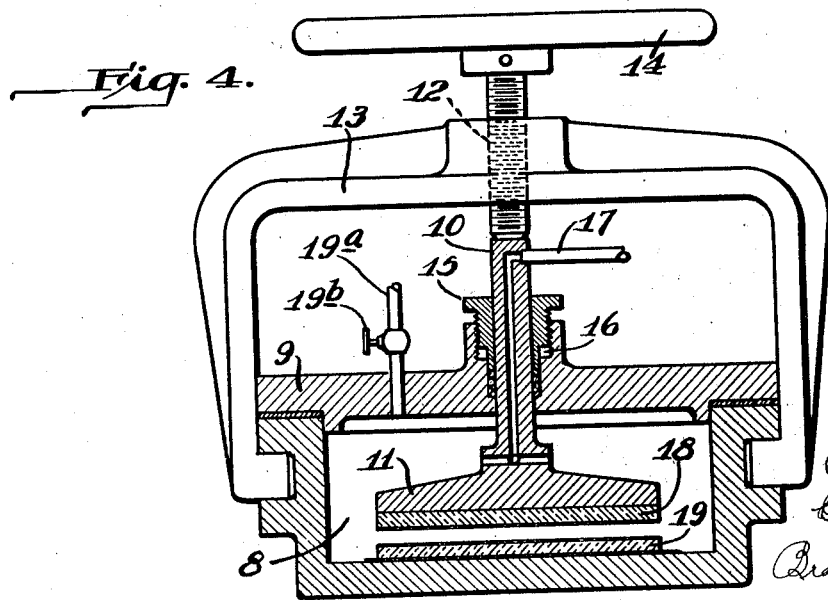

The invention relates to a process and apparatus for making safety glass which ordinarily comprises two sheets of glass with an interposed layer of non-brittle material, such as celluloid or a resin. The objects of the invention are to provide a new method and apparatus for producing the laminated product and for avoiding the presence of entrapped air in the form of bubbles in the layer of material between the glass sheets. Certain forms of apparatus for practicing the method are shown in the accompanying drawings, wherein:

Figs. 1, 2 and 3 illustrate the simplest form of practicing the invention in connection with a rubber bag, Fig. 1 being a plan view, Fig. 2 being a section on the line II—II of Fig. 1 showing the parts in their first position, Fig. 3 being a similar section on the line II—II of Fig. 1, but showing the parts in a different position. Fig. 4 is a vertical section through a modified form of apparatus. Figs. 5 and 6 are vertical sections through another modification, Fig. 6 being an enlargement of a part of the section of Fig. 5. And Fig. 7 is a vertical section through still another form of apparatus which may be employed.

Referring to the apparatus of Figs. 1 to 3, 1 is a rubber bag provided with a connection 2 for exhausting the air therefrom and with the cut-off valve 3; 4 is a clamp for closing the bag; and 5, 5 are a pair of wood members provided at their inner edges with the wedges 6 which in the position of Fig. 2 serve to keep the glass plates 7, 7 separated while the air is exhausted from the bag.

Each of the sheets 7, 7 is coated on its inner face with a reinforcing layer which is in a sticky or plastic condition. This reinforcing material may be nitro-cellulose in a suitable solvent or plasticizer, such as dibutyl phthalate or amyl acetate which may be mixed, if desired, with a low percentage of low boiling solvent, such as acetone. The coating may also be any one of the various resins suitable as a reinforcement, such as Canada balsam or one of the numerous synthetic resins, among which may be mentioned the glyptal or vinyl resins mixed with a sufficient quantity of plasticizer or solvent to render the material soft and sticky. These coatings may be applied to the glass sheets by any well-known method, such as spraying, brushing on, or applying with a soft roller.

The sheets as coated with the reinforcing material are placed in the bag 1 with their opposing coated faces separated, as indicated in Fig. 2, after which the air is exhausted from the bag and the operator grasps the wedge members 5, 5 and by stretching the rubber bag retracts the wedges so that the sheets come into engagement, this being caused by gravity and by the pressure of the air on the exterior of the bag. This pressure is sufficient to cause the coated surfaces to adhere and unite into a single layer. Since there is no air in the bag when this occurs, no bubbles are formed in the reinforcing layer, such as would be the case if the sheets were placed together while exposed to the atmosphere. The pressure exerted on the bag by the atmosphere forcing the sheets together is not sufficient to cause the soft material between the sheets to exude and thin out to any noticeable degree, but if under certain conditions it is desired that more pressure be applied, the rubber bag may be placed in an autoclave and subjected to pressure in a manner well-known in the art.

Fig. 4 illustrates another form of apparatus for carrying out the same invention. In this apparatus, a chamber 8 is provided having a movable cover 9, which also carries a spindle 10 provided at its lower end with a header 11. The spindle is moved down by means of a screw 12 threaded through a yoke 13 and provided at its upper end with a hand wheel 14. A stuffing box 15 is provided for making the spindle tight where it passes through the cover 9. The spindle is also provided with a passage 16 to which is connected a vacuum pipe 17. By this means the air may be exhausted from the chamber 8 for the same purpose as above explained in connection with the apparatus of Figs. 1 to 3. In using the apparatus, the sheets of glass 18 and 19 are coated upon their opposing surfaces with reinforcing material, as heretofore described, and the upper sheet 18 is releasably stuck to the lower face of the header by means of a suitable adhesive of a type which may be readily released.

In operating the apparatus the parts are positioned as indicated in Fig. 4 and air is exhausted from the chamber, after which the screw 12 is operated to move the header 11 down to cause engagement between the coated surfaces of the glass plates. Enough pressure is applied to cause the coated surfaces to adhere throughout their area, but such pressure is not sufficient as to substantially thin the layer as this would involve a waste of material. The air vent for the chamber 8 is provided in the form of a pipe 19a provided with a release valve 19b.

Figs. 5 and 6 illustrate a third apparatus for carrying out the invention, while the glass plates 20 and 21 are supported in an upright position in a chamber 22. In this form of apparatus, the chamber is made up of a fixed platen 23, an opposing movable platen 24 and end walls 25, preferably of rubber, each having at its ends the lips 26 adapted to make sealing contact with the shoulders 27 when the platen 24 is moved to closed position, as indicated in Fig. 5. In this manner a seal is provided for the chamber by the operation of moving the platen 24 to an operative position. The platen 24 is mounted for sliding movement upon a base 28 and is operated by a plunger 29 working in a cylinder 30. A pair of pipes 31, 32 supply a liquid under pressure for moving the plunger in both directions. The space between the platens may be vented by an air pipe 33 provided with a valve 34. This pipe may also be employed for applying additional pressure to the sheets after they have been composited in the chamber.

The fixed platen 23 is also provided with a chamber 35 whose rear plate 36 may be reinforced by the stay bolts 37. Connections 38, 38 are also provided by means of which a heating fluid, such as steam, may be supplied to the chamber. The chamber is also provided with a vent 39 having a cut-off valve 40. The sheets of glass 21 are supported by the members 41, 41 (Fig. 6) which telescope into the recesses 42, 42 in the platens and are normally held in advanced position by the springs 43, 43, and the outer ends of the recesses 42, 42 are closed by means of the screw plugs 44, 44. Members similar to 41, 41 may be provided opposite the vertical end edges of the plates 20 and 21 for lining up the sheets in a horizontal direction.

In operation the inner faces of the glass sheets 20 and 21 are provided with the soft reinforcing material as heretofore described and the plunger 29 is operated to move the platen 24 to the position shown in Fig. 5. This movement first causes the strips 25 to close the chamber, after which, and before the glass sheets come into contact, air is withdrawn from the chamber by means of the vacuum pipe 45, thus insuring that there will be no bubbles between the glass sheets due to the entrapping of air therebetween. The final movement of the plunger brings the coated faces of the glass sheets into sealing contact. This completes the operation, unless it is desired to apply additional pressure to the sandwich, which may be done by admitting air under pressure through the pipe 33. In order to cushion the rear faces of the glass sheets, the plates of copper gauze 46, 46 are preferably employed between the rear faces of the sheets and the faces of the platens 23 and 24.

Fig. 7 illustrates a further modification in which the glass sheets are composited in a horizontal position and provision is made for compositing a large number at one time. In this form of apparatus, the pairs of glass sheets are held separated during the exhausting operation by wedge devices similar to those employed in the construction of Figs. 1 to 3. The chamber employed may be made very large and, if desired, vacuum can be maintained in the chamber for a long period of time, thus insuring the withdrawal of a certain amount of solvent preliminary to the laminating operation.

Referring to the drawings, 47 is the vacuum chamber provided with a cover 48. This cover is preferably held in position releasably by means of latches 49 operated by suitable levers 50 and 51, the method of securing the cover in position being immaterial. The lower portion of the casing 52 which forms the chamber 47 is provided with a cylinder 56 in which is mounted a plunger 57, such plunger being operated by means of liquid introduced through the pipe 58. Mounted upon the upper end of the plunger is the head 59 which carries the series of pairs of glass plates 60, 60, etc. Each pair of plates is separated by means of the wedge members 61 which lie between a pair of angle members 62, 62 mounted for sliding movement on a transverse plate 63 supported upon shoulders 64 on the casing 52. Each series of wedge members 61 is clamped in its member 62 by means of a screw 64 working through a bracket 65 carried by the upper end of the member 62. The lower ends of the members 62 are provided with rods 66 secured in position by the screws 67, and the inner ends of these rods are adapted to be engaged by the beveled upper end 68 of the plunger 57.

In operation, the parts, including the coated glass plates 60, are positioned as indicated in Fig. 7, after which the air is exhausted from the chamber by means of the vacuum pipe 69. Liquid is then supplied through the pipe 58 to move the plunger upward. The first portion of this upward movement causes an outward movement of the members 62, 62 due to the camming action of the beveled end 68 of the plunger upon the inner ends of the rods 66. This outward movement of the members 62, 62 withdraws the wedges 61, 61 from between the pairs of coated plates permitting the upper members of each pair to move down into engagement with the sheet beneath. A further upward movement of the plunger 57 now causes an upward movement of the head 59 and the stack of sheets carried thereby, this movement being continued until the upper member of the sheet engages the abutment 69, after which any desired degree of pressure may be secured in the stack of plates. Such pressure is preferably not sufficient to cause the soft material between the pair of plates to exude to any substantial degree. In order to prevent any scratching of the upper plate of the stack, a sheet of blotting paper 70 is preferably interposed between such plate and the abutment 69. The chamber is also provided with an air pipe 71 through which pressure may be applied to the chamber 47 if desired. The application of such pressure would occur after the operation as heretofore described.

It is also possible to use the process by coating only one sheet of glass with the sticky reinforcing material, such coating being, of course, of greater thickness, than where both sheets of glass are coated. In other respects the procedure is the same as heretofore described. It is further possible to modify the process by including a thin sheet of celluloid or other reinforcing between the coated sheets of glass, or in this case, the sheet of reinforcing might be coated with the sticky reinforcing instead of the glass. The process follows that heretofore outlined, the only difference being the maintenance of the sheets of glass separated from the celluloid during the step of exhausting the air.

What I claim is:

1. A process of making safety glass which consists in coating one of the opposing faces of a pair of glass sheets with a layer of sticky reinforcing material, exhausting the air from the space surrounding aid sheets while the sheets are held apart so that said layers are out of contact, and then pressing the coated faces of the sheets together while the air is exhausted.

2. A process of making safety glass which consists in coating one of the opposing faces of a pair of glass sheets with layers of sticky reinforcing material, exhausting the air from the space surrounding said sheets while the sheets are held apart so that said layers are out of contact, pressing the coated faces of the sheets together while the air is exhausted from said space with sufficient force to cause said coatings to adhere and unite forming a single layer, and then exposing the faces and edges of the sandwich thus formed to fluid pressure.

3. A process of making safety glass which consists in coating the opposing faces of a pair of glass sheets with layers of sticky reinforcing material, exhausting the air from the space surrounding said sheets while the sheets are held apart so that said layers are out of contact, and then pressing the coated faces of the sheets together while the air is exhausted from such space, the pressure exerted being sufficient to cause the coatings to adhere and unite but not sufficient to thin the layer thus formed to any substantial degree.

4. A process of making safety glass which consists in coating the opposing faces of a pair of glass sheets with layers of sticky reinforcing material, exhausting the air from the space surrounding said sheets while the sheets are held apart so that said layers are out of contact, pressing the coated faces of the sheets together while the air is exhausted from said space with sufficient force to cause said coatings to adhere and unite forming a single layer, but not sufficient to cause the material to exude to any substantial extent from between the sheets, and then exposing the faces and edges of the sandwich thus formed to fluid pressure.

5. Apparatus for making safety glass comprising a chamber, means for exhausting the air therefrom, means for supporting a pair of glass sheets in the chamber with their opposing surfaces separated, means for withdrawing the supports from between the glass sheets in the evacuated chamber, and means for causing such surfaces to engage while the air is exhausted from the chamber.

6. Apparatus for making safety glass comprising a chamber, means for exhausting the air therefrom, means for supporting a pair of glass sheets in the chamber with their opposing surfaces separated, means for removing said supporting means in the evacuated chamber, means for causing such surfaces to engage under relatively light pressure while the air is exhausted from the chamber, and means for then supplying fluid under pressure to the chamber.

7. Apparatus for making safety glass comprising a chamber, means for exhausting the air therefrom, means for supporting a pair of glass sheets in the chamber with their opposing surfaces separated, means for removing said supporting means in the evacuated chamber, and a plunger for pressing the sheets together while the air is exhausted from the chamber.

8. Apparatus for making safety glass comprising a chamber, means for exhausting the air therefrom, means for supporting a pair of glass sheets in the chamber with their opposing surfaces separated, means for removing said supporting means in the evacuated chamber, a plunger for pressing the sheets together while the air is exhausted from the chamber, and means for supplying fluid under pressure to the chamber after the sheets have been pressed together.

9. Apparatus for making safety glass comprising a chamber, means for exhausting the air therefrom, spacing means for supporting a pair of glass sheets one above the other with their opposing surfaces separated, means for removing said supporting means in the evacuated chamber, and means controlled from the exterior of the chamber for removing the spacers and permitting the upper sheet to move down by gravity and engage the lower sheet.

10. Apparatus for making safety glass comprising a chamber, means for exhausting the air therefrom, spacing means for supporting a pair of glass sheets one above the other with their opposing surfaces separated, and means controlled from the exterior of the chamber for withdrawing the spacers while a vacuum is maintained therein and then applying force to press the sheets into engagement.

11. Apparatus for making safety glass comprising a chamber, means for exhausting the air therefrom, a vertically movable plunger mounted for movement through the chamber and adapted to support one of a pair of glass sheets, spacing means for supporting a second glass sheet about the first sheet in opposition thereto, and means operated by the upward travel of the plunger for withdrawing said spacing members and applying pressure to the sheets.

12. Apparatus for making safety glass comprising a chamber, means for exhausting the air therefrom, a vertically movable plunger mounted for movement through the chamber and adapted to support one of a pair of glass sheets, spacing means for supporting a second glass sheet about the first sheet in opposition thereto, a series of pairs of glass sheets supported upon said second sheet with spacing means between each pair of sheets, means operated by the upward travel of the plunger for withdrawing said spacing means, and stop means for the upper member of the stack of sheets whereby pressure may be applied to the stack by the plunger.

13. A process of making safety glass which consists in coating the opposing faces of a pair of glass sheets with layers of sticky reinforcing material positioning the sheets in upright position with said faces in opposition, but separated, exhausting the air from the space surrounding the sheets and then pressing the coated faces of the sheets together while the air is exhausted from such space.

14. A process of making safety glass which consists in coating the opposing faces of a pair of glass sheets with layers of sticky reinforcing material, positioning the sheets in upright position inclined away from each other with said faces in opposition, but separated, exhausting the air from the space surrounding the sheets and then pressing the coated faces of the sheets together while the air is exhausted from such space.

15. Apparatus for making safety glass comprising a chamber having opposing vertical side walls, one of which is mounted for movement toward and from each other, sealing means around the side edges of said walls which are made effective as said movable wall approaches the other wall, means for exhausting the air from the chamber, telescoping supporting means for the lower edges of the glass sheets which are to be composited in the chamber, and means for moving the movable wall of the chamber back and forth.

16. A process of making safety glass which consists in coating one of the opposing faces of a pair of transparent sheets with a layer of sticky reinforcing material, exhausting the air from the space surrounding the sheets while the sheets are held apart with the reinforcing material out of contact with the opposing surface of the other sheets and then pressing the sheets together while the air is exhausted.

JAMES H. SHERTS.